United States Patent
Cox

(10) Patent No.: US 12,092,231 B2
(45) Date of Patent: Sep. 17, 2024

(54) RAPID-INFLATE VALVE STEMS AND ASSOCIATED SYSTEMS AND METHODS

(71) Applicant: CHRISTOPHER COX CREATIVE, Park City, UT (US)

(72) Inventor: Christopher Paul Cox, Park City, UT (US)

(73) Assignee: Christopher Cox Creative, Park City, UT (US)

(*) Notice: Subject to any disclaimer, the term of this patent is extended or adjusted under 35 U.S.C. 154(b) by 0 days.

(21) Appl. No.: 18/075,411

(22) Filed: Dec. 5, 2022

(65) Prior Publication Data

US 2024/0183457 A1 Jun. 6, 2024

(51) Int. Cl.
| | |
|---|---|
| F16K 15/20 | (2006.01) |
| B60C 29/00 | (2006.01) |
| B60C 29/02 | (2006.01) |
| F16K 15/06 | (2006.01) |

(52) U.S. Cl.
CPC .......... *F16K 15/207* (2013.01); *B60C 29/002* (2013.01); *B60C 29/02* (2013.01); *F16K 15/063* (2013.01); *Y10T 137/3584* (2015.04)

(58) Field of Classification Search
CPC ................ B60C 29/002; F16K 15/207; Y10T 137/3584; Y10T 137/36; Y10T 137/3724; Y10T 137/3786; Y10T 137/7925; Y10T 137/87917; Y10T 137/87965
See application file for complete search history.

(56) References Cited

U.S. PATENT DOCUMENTS

| | | | | |
|---|---|---|---|---|
| 764,642 | A * | 7/1904 | Stenwall | F16K 15/026 137/538 |
| 1,865,231 | A * | 6/1932 | Buck | F16K 15/20 137/614.19 |
| 2,311,748 | A * | 2/1943 | Gora | B60C 29/00 152/DIG. 7 |
| 2,928,417 | A * | 3/1960 | Buckner | F16K 15/063 137/538 |
| 3,180,349 | A * | 4/1965 | Steer | B60C 29/02 137/234.5 |
| 6,009,902 | A * | 1/2000 | Troiani | B60T 17/043 251/149.6 |
| 2003/0172973 | A1* | 9/2003 | Abe | F16K 15/026 137/540 |

(Continued)

*Primary Examiner* — Robert K Arundale
(74) *Attorney, Agent, or Firm* — Christensen O'Connor Johnson Kindness PLLC

(57) ABSTRACT

A valve assembly for controlling inflation and deflation is provided. The valve assembly includes a rapid-inflate valve having an annular body configured to couple to a valve stem port of a wheel and selectively permit gas flow into a tire. The valve has a sealing surface in a chamber with a slidable sealing member biased toward the sealing surface. In a closed position, the sealing member can be positioned in contact with the sealing surface to prohibit gas flow through the valve, and in an open position, the sealing member can be positioned away from the sealing surface to permit gas flow through the valve. Wheel can include dual valve stem ports. In this configuration, the first port has the rapid-inflate valve assembly and the second port can have a rapid-deflate valve stem, a rapid-deflate valve stem cap, a rapid-deflate to pressure set valve stem, or a standard valve stem.

13 Claims, 14 Drawing Sheets

(56) References Cited

U.S. PATENT DOCUMENTS

| | | | |
|---|---|---|---|
| 2004/0123901 A1* | 7/2004 | Sampson | F16K 15/205 |
| | | | 137/227 |
| 2005/0028865 A1* | 2/2005 | Nikolayev | F16L 37/23 |
| | | | 137/223 |
| 2007/0204946 A1* | 9/2007 | Medley | B60B 25/20 |
| | | | 152/427 |
| 2013/0061945 A1* | 3/2013 | Tigges | B60C 29/005 |
| | | | 137/223 |

\* cited by examiner

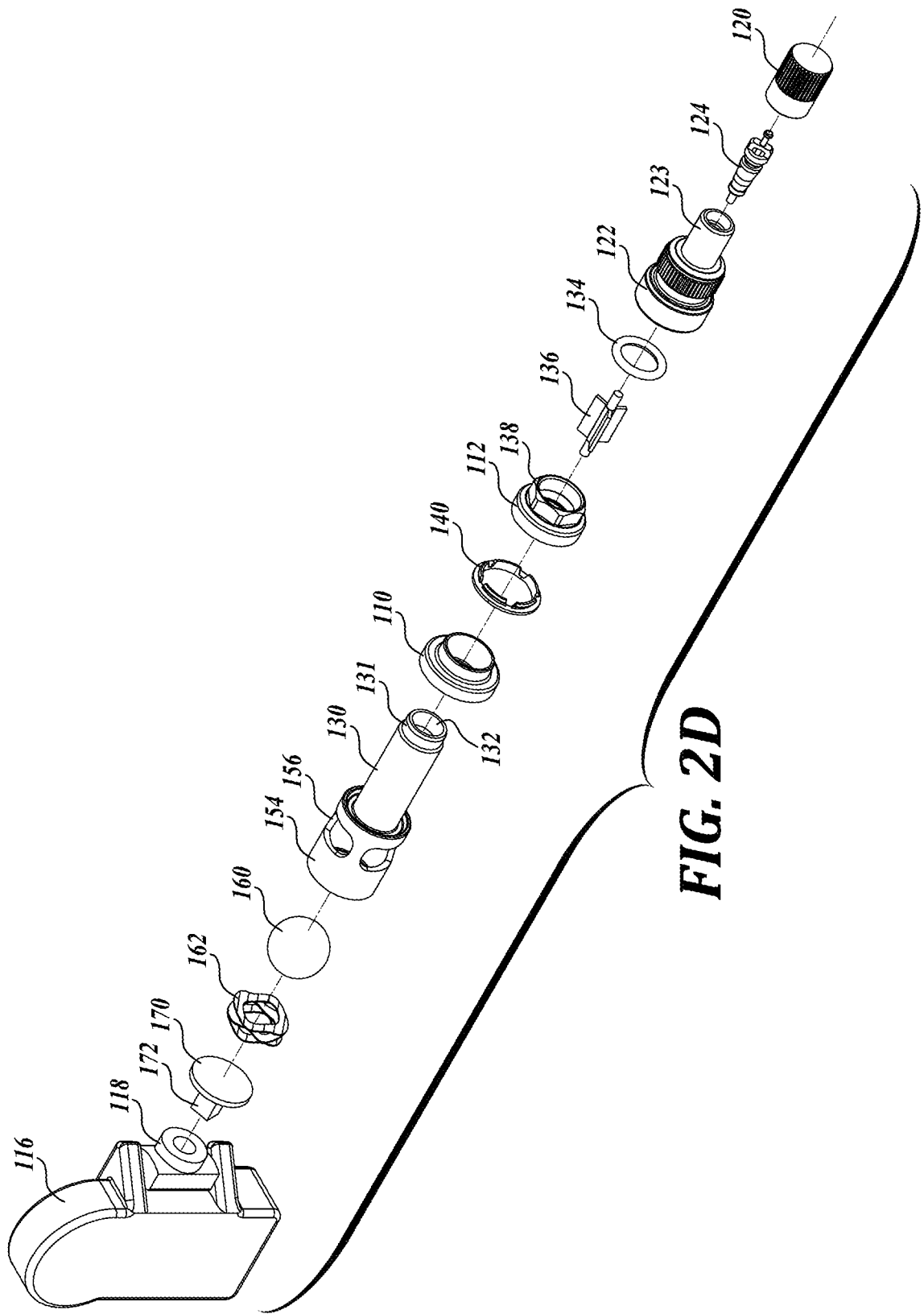

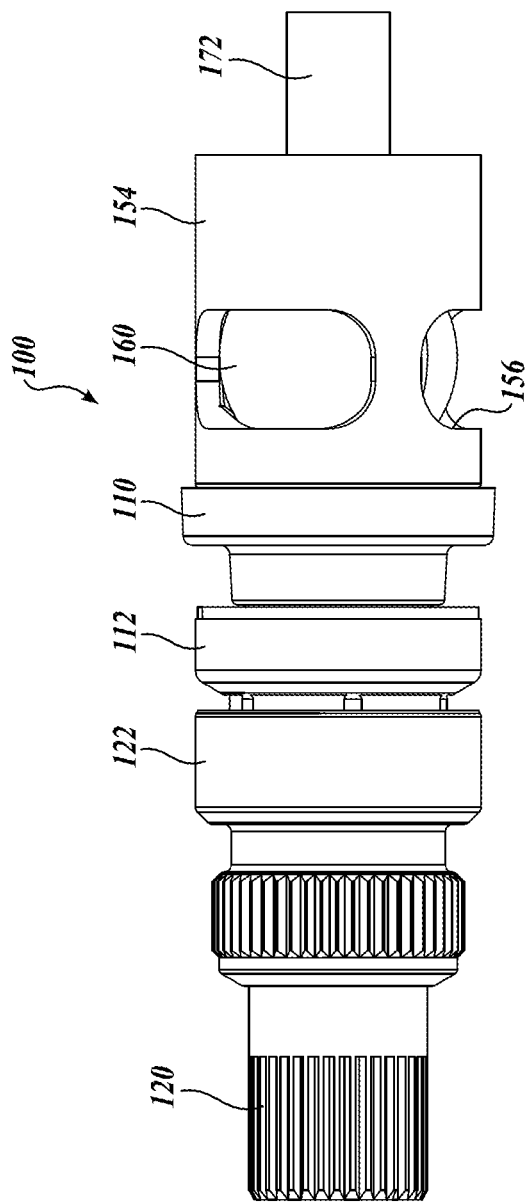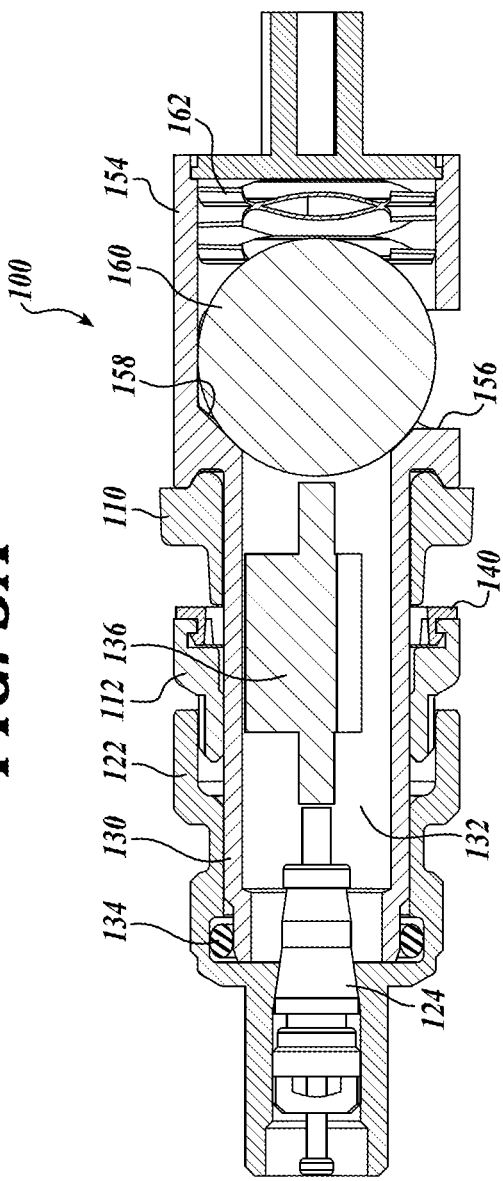
FIG. 3A
FIG. 3B

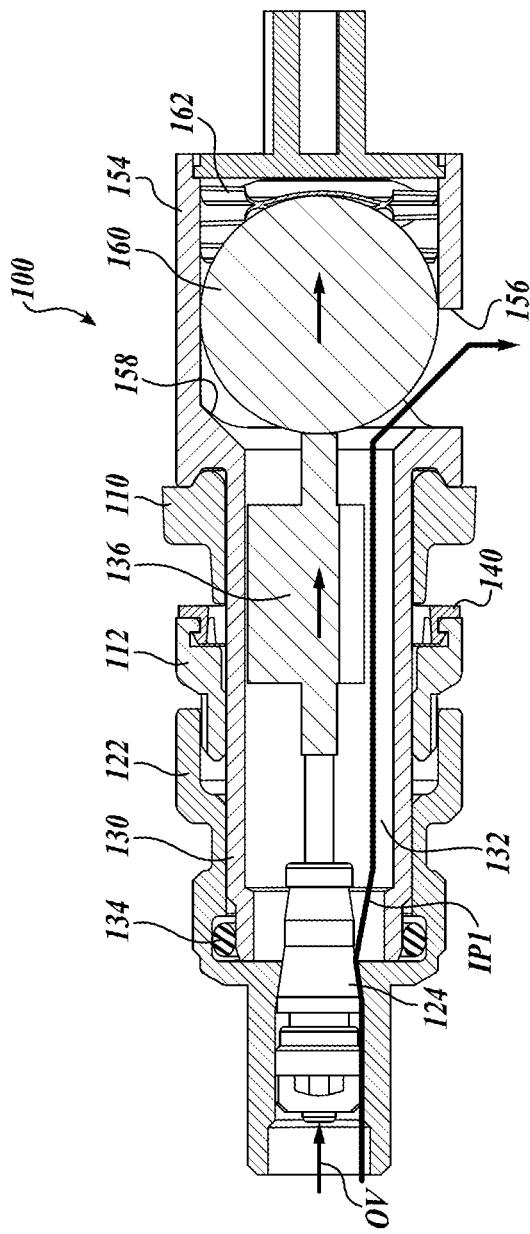
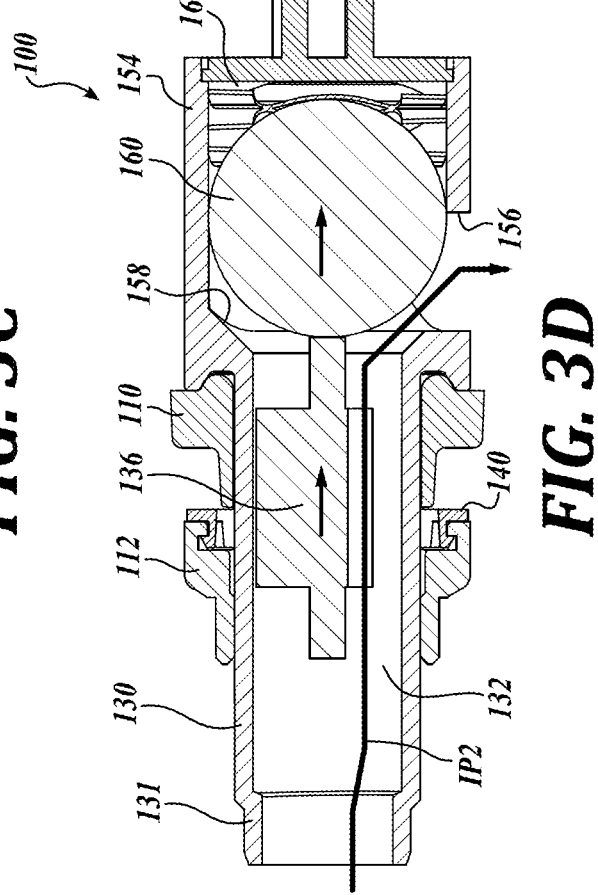
FIG. 3C
FIG. 3D

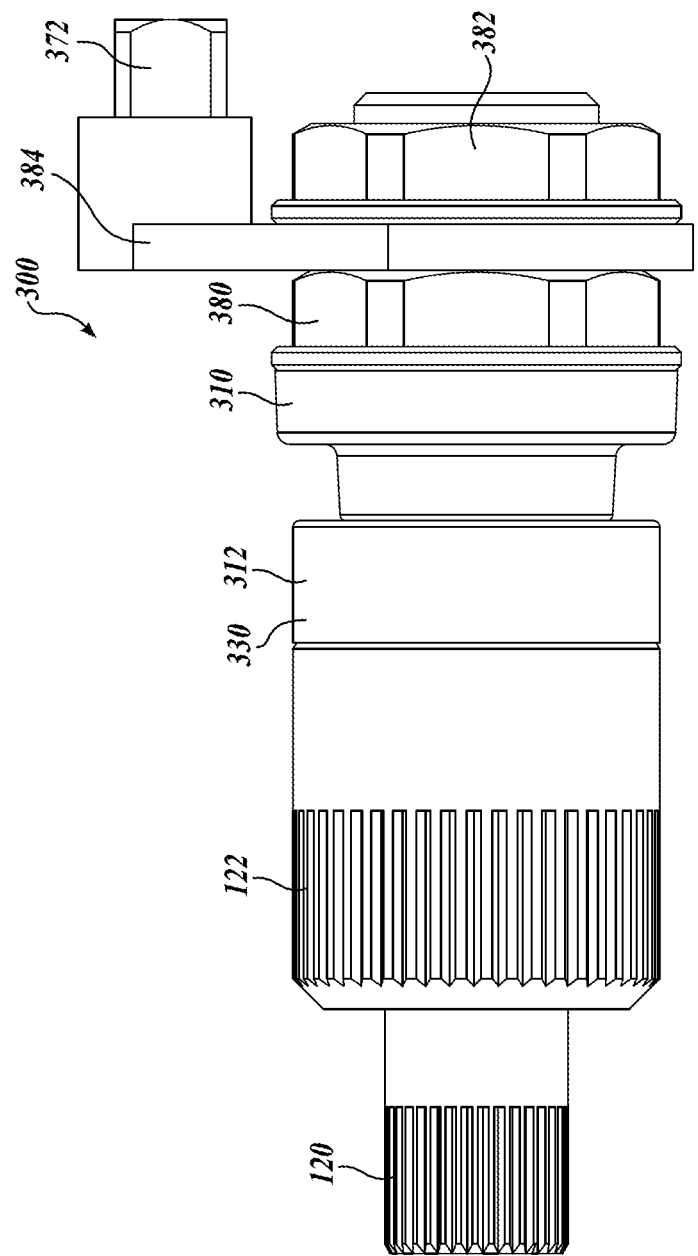

RAPID-INFLATE VALVE STEMS AND ASSOCIATED SYSTEMS AND METHODS

BACKGROUND

Inflatable tires are typically inflated by transferring gas (e.g., air, nitrogen, etc.) through a valve and into the pressure chamber of the tire. The valve has a valve stem that contains a check system (e.g., a valve core) that can open to permit the stem to receive gas during inflation and can close to retain gas within the pressure chamber at a specified gas pressure level depending on the materials, specification, temperature, intended application, etc. of the tire. The check system of the valve can be a self-contained valve core positioned within the valve stem and configured to operably open to receive gas during inflation or expel gas during deflation of the tire. The valve core check system is typically biased to a closed position by the pressure in the inner chamber and/or a biasing spring to prevent gas from escaping the tire.

Valves are commonly used on automobile, motorcycle, and bicycle tires, but can also be used in other applications, such as machinery, carts, tools, etc. Some common conventional valve designs include a Schrader valve, an American valve, a Presta valve, a Dunlop valve, and others. Certain valve designs are standardized such that universal inflation/deflation tools and/or pressure gauges can be used with the port or interface to inflate and/or deflate the tire mounted on a wheel. Typical wheel configurations use a single valve for both inflation and deflation. In some configurations, tire pressure monitoring systems (TPMS) can be integrated with the valve such that a computer of the vehicle can remotely monitor the pressure within the pressure chamber of the tire.

In some off-road situations with bumpy and/or rocky terrain, a lower gas pressure than would be used in on-road conditions can increase compliance of the tire and improve traction. When a lower gas pressure is desired, a vehicle operator can manually deflate each tire to the desired pressure for optimal traction and performance. When returning to on-road conditions, the vehicle operator can inflate each tire back to normal pressures. Deflation using some conventional valve designs requires opening the valve core by translating a core needle inward to release gas from the pressure chamber of the tire. The same core needle is translated inward during inflation using some conventional valve designs. These conventional valve cores generally have small gas flow passageways relative to the valve stem opening, which causes both the inflation and deflation process to be tedious and time-consuming.

BRIEF DESCRIPTION OF THE DRAWINGS

FIG. 2D is an exploded view of the valve stem assembly of FIGS. 2A-2C;

FIGS. 3A and 3B are side and side cross-sectional views, respectively, of the valve stem assembly of FIGS. 2A-2C, with a check ball of the ball-checked rapid-inflate valve stem assembly shown in a closed position;

FIG. 3C is a side cross-sectional view of the valve stem assembly of FIGS. 2A-2C, with the check ball shown in an open position, and showing a representative inflation path of the gas flow into a pressure chamber within the tire;

FIG. 3D is a side cross-sectional view of the valve stem assembly of FIGS. 2A-2C, with the check ball shown in an open position and with the compatibility fill cap assembly removed, and showing a representative inflation path of the gas flow into a pressure chamber within the tire;

FIGS. 5A and 5B are side and side cross-sectional views, respectively, of a poppet-checked rapid-inflate valve stem assembly configured in accordance with embodiments of the present disclosure, with a poppet of the poppet-checked rapid-inflate valve stem assembly shown in FIG. 5B in an open position, and FIG. 5B showing a representative inflation path of the gas flow into the pressure chamber within the tire;

DETAILED DESCRIPTION

Figure 1A:
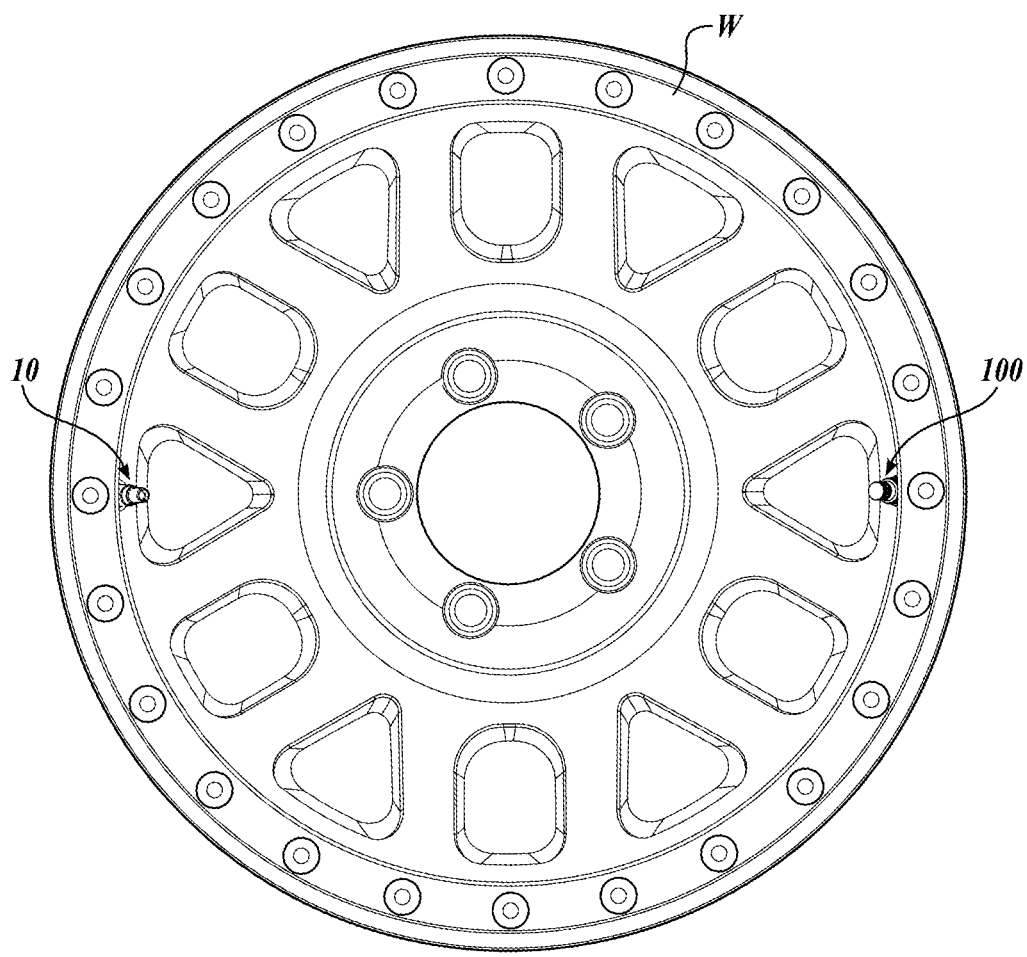
FIGS. 1A-1C are environmental perspective, enlarged detail, and cross-sectional views, respectively, showing a dual valve stem port wheel having a first valve stem assembly and a second valve stem assembly cover configured in accordance with embodiments of the present disclosure.

The following disclosure describes various embodiments of rapid-inflate valve stems and associated systems and components for use with valves of pressure chambers, e.g., valves of inflatable tires. In some embodiments, valve stems configured in accordance with the present disclosure include high-flowrate inflation and deflation configurations to transfer gas into the pressure chamber and thereby raise the pressure within the pressure chamber relatively quickly compared to conventional valves. The present disclosure references valve stems described herein as related to rapid-inflation configurations for increased flowrate when, e.g., filling a tire; however, the valve stems disclosed herein are also suitable to rapidly deflate pressure chambers and should not be construed as limited to rapid-inflation. The rapid-inflate valve stems can be configured to interface with the wheel of the vehicle through a standardized valve stem form factor, e.g., a Schrader valve stem form factor, so that the rapid-inflate valve stems can be installed without modification to the wheel. Embodiments of the rapid-inflate valve stems of the present disclosure can be compatible with TPMS remote sending units. The following disclosure further describes various embodiments of wheels having dual valve stem ports configured to receive various valve stems, e.g., rapid-deflate valve stems and covers, rapid-inflate valve stems and covers, deflate to pressure set valve stems, etc.

In some situations, such as use during use of a vehicle in off-road terrain, it may be desirable to deflate the tires to a lower pressure than the standard pressures for on-road use. Once the use in off-road terrain is complete, it may be desirable to inflate the tires to the standard on-road use pressures. In other examples, such as when inflating a newly mounted tire, the tires may be inflated to standard on-road use pressures prior to installation on a vehicle. Conventional valves are not configured for rapid-inflation of the tire. By way of an example, a vehicle tire at atmospheric pressure can take up to three minutes to inflate to on-road operating pressures (e.g., 30-50 PSI). In this regard, the rapid-inflate valve stems of the present disclosure provide faster inflation than inflation using conventional valves, which in some embodiments can be about twenty times faster than inflation using conventional valves. In some embodiments, the rapid-inflate valves of the present disclosure are capable of transferring gas into the pressure chamber of the tire at about thirty times faster, or greater, than transferring gas into the pressure chamber using conventional valves.

The rapid-inflate valve stems of the present disclosure can be configured for high gas flow rate during inflation of a tire with a standardized form factor (e.g., a Schrader valve form factor) for compatibility with standard inflation and pressure measuring components (e.g., Schrader-compatible filling nozzles, pressure gauge interfaces, etc.), and/or with high-flowrate form factor for use with high-flowrate inflation components as will be described in greater detail below. In some embodiments where the wheel includes dual valve stem ports, a pressure gage can be operably coupled to one of the valve stems (e.g., the rapid-inflate valve stem, or a valve stem located at the other of the dual valve stem ports) and remain in place while inflating or deflating the tire. Embodiments of the rapid-inflate valve stems and other systems of the present disclosure are suitable for use with any pressure chamber having a valve stem interface.

In some configurations, it may be desirable to have dual valve stem ports on a single wheel. In these embodiments, the dual ports can be configured with the same or different types of valve stems as will be described in greater detail below. In one example, a wheel with dual valve stem ports can include a rapid-inflate valve stem in one of the dual ports and a rapid-deflate valve stem, a rapid-deflate valve stem cap, a rapid-deflate to pressure set valve stem, or a standard valve stem in the other of the dual ports. In another example, a wheel with dual valve stem ports can include a rapid-deflate valve stem cap in one of the dual ports and a standard valve stem in the other of the dual ports. In another example, a wheel with dual valve stem ports can include a rapid-deflate to pressure set valve stem in one of the dual ports and a rapid-deflate valve stem or a rapid-deflate valve stem cap in the other of the dual ports.

Certain details are set forth in the following description and in FIGS. 1A-6B to provide a thorough understanding of various embodiments of the present disclosure. In other instances, well-known structures, systems, materials and/or operations often associated with valve stems and associated components are not shown or described in detail in the following disclosure to avoid unnecessarily obscuring the description of the various embodiments of the disclosure. Those of ordinary skill in the art will recognize, however, that embodiments of the present disclosure can be practiced without one or more of the details set forth herein, or with other structures, methods, components, and so forth. The terminology used below is to be interpreted in its broadest reasonable manner, even though it is being used in conjunction with a detailed description of certain examples of embodiments of the present disclosure. Indeed, certain terms may even be emphasized below; however, any terminology intended to be interpreted in any restricted manner will be overtly and specifically defined as such in this Detailed Description section.

The accompanying Figures depict embodiments of the present disclosure and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the Figures, identical reference numbers identify identical, or at least generally similar, elements.

Figure 1B:
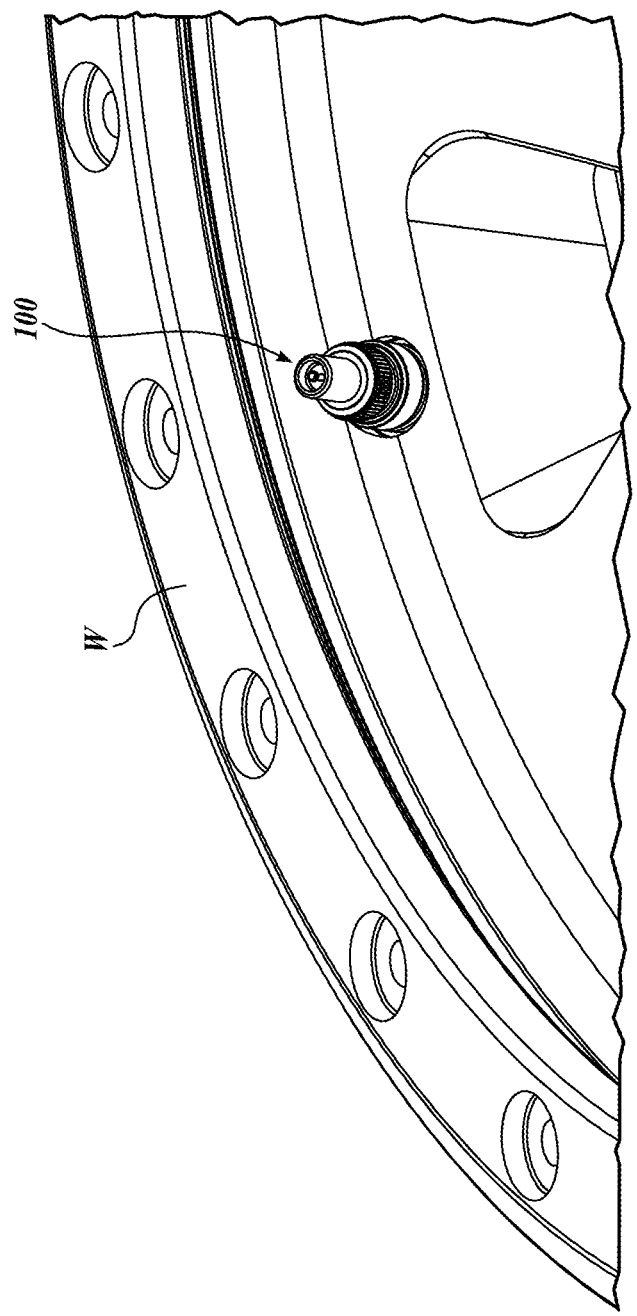
Figure 1C:
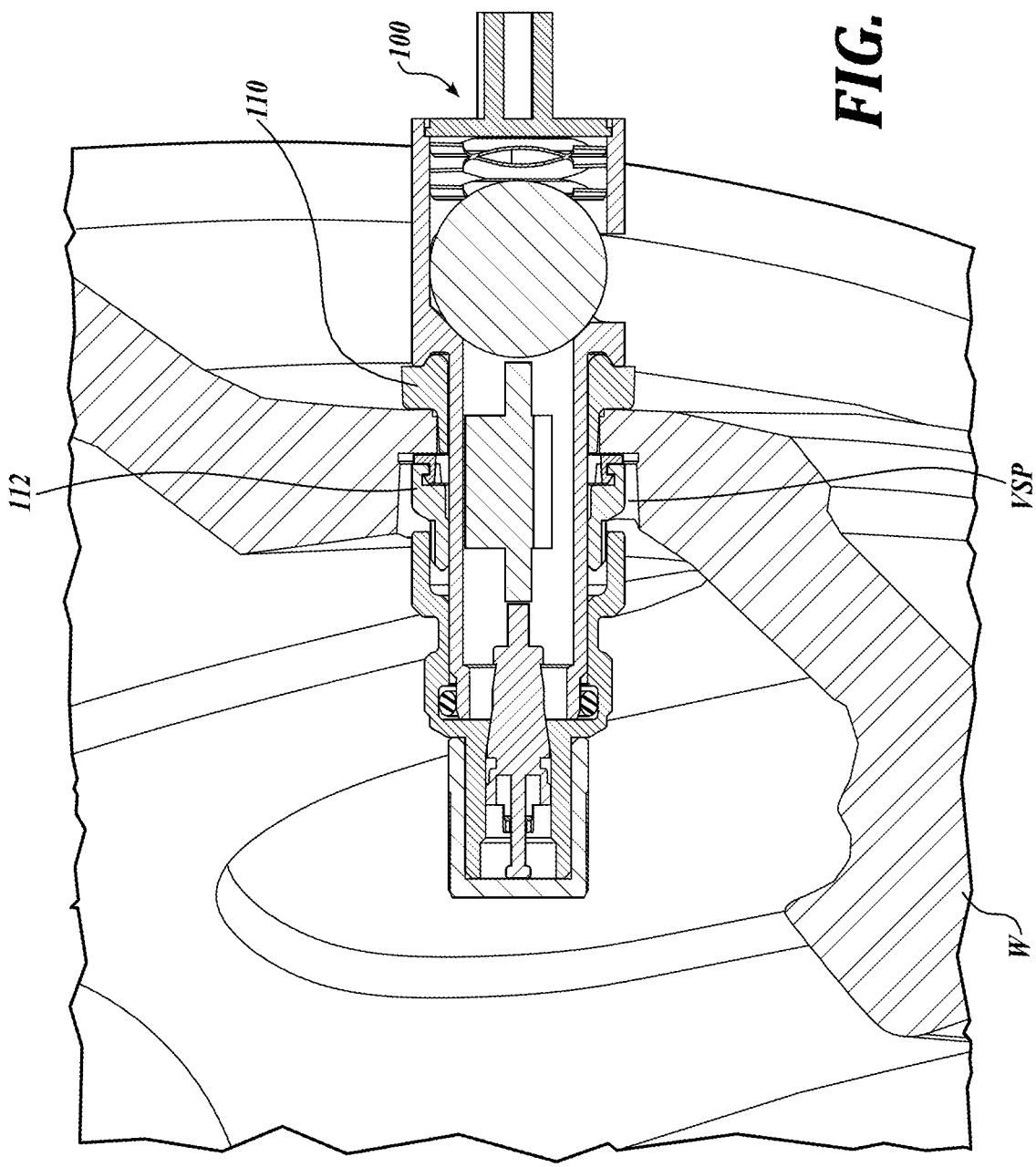

FIGS. 1A-1C are environmental perspective, enlarged detail, and cross-sectional views, respectively, showing a dual valve stem port wheel W having a first valve assembly 10 ("assembly 10") and a second valve assembly 100 ("assembly 100"). Although the assembly 100 is described herein with reference to a dual valve stem port wheel, the embodiments of the assembly 100 disclosed herein are suitable for use with wheels having a single valve stem port. In some embodiments as will be described in greater detail below, the assembly 100 can be a ball-checked rapid-inflate valve stem assembly ("assembly 100" of FIGS. 2A-3D), a plate-checked rapid-inflate valve stem assembly ("assembly 200" of FIGS. 4A-4B), or a poppet-checked rapid-inflate valve stem assembly ("assembly 300" of FIGS. 5A-5D). The checking system can be referred to as a "sealing member" herein. Although the assemblies 100, 200, and 300 show a check ball 160 and a check plate 260, and a poppet 360, respectively, other embodiments of the sealing member are also within the scope of the present disclosure, e.g., a check cone, a check cylinder, a pill-shaped member, etc. As shown in FIG. 1C, the assembly 100 can be mounted to one of the dual valve stem ports VSP by inserting the assembly 100 through the valve stem port VSP and clamping on either side of the valve stem port VSP with an inner clamp portion 110 and an outer clamp portion 112 that can be configured to threadingly engage with the another component of the assembly 100 to capture the wheel W therebetween. The configuration of the inner clamp portion 110 and the outer clamp portion 112 can ensure gas does not travel through the valve stem port VSP past the assembly 100.

As described above, the dual valve stem port wheel W can include the assembly 100 in one of the dual valve stem ports VSP and the assembly 10 in the other of the dual valve stem ports VSP. In some embodiments, the assembly 10 can be a rapid-deflate valve stem, a rapid-deflate valve stem cap, a rapid-deflate to pressure set valve stem, or a standard valve stem. In embodiments where the assembly 10 is a rapid-deflate valve stem positioned in the other of the dual valve stem ports VSP opposite the assembly 100, the rapid-deflate valve stem can be substantially similar to rapid-deflate valve stems shown and described in U.S. patent application Ser. No. 17/362,526, titled "Rapid-deflate valve stem and associated systems and methods," filed Jun. 29, 2020, which is incorporated by reference herein in its entirety. In embodiments where the assembly 10 is a rapid-deflate valve stem cap or cover positioned in the other of the dual valve stem ports VSP opposite the assembly 100, the rapid-deflate valve stem cap or cover can be substantially similar to rapid-deflate valve stem covers shown and described in U.S. patent application Ser. No. 17/979,723, titled "Rapid-deflate valve stem cover and associated systems and methods," filed Nov. 2, 2022, which is incorporated by reference herein in its entirety. In other embodiments, the assembly 10 can be a rapid-deflate to pressure set valve stem such as the rapid-deflate to pressure set valve stem assembly 400 described below with reference to FIGS. 6A and 6B.

Figure 2A:
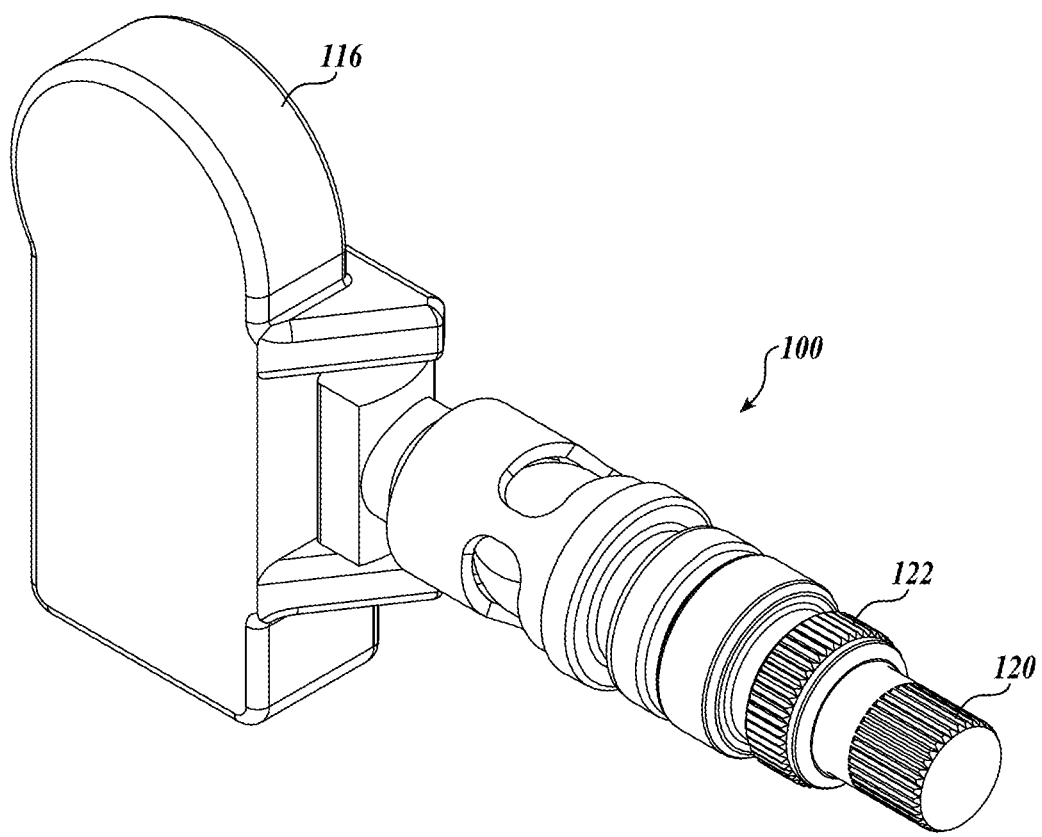
FIGS. 2A-2C are perspective views of a ball-checked rapid-inflate valve stem assembly, showing the full valve stem assembly (FIG. 2A), the valve stem assembly with a dust cap removed (FIG. 2B), and the valve stem assembly with a compatibility fill cap assembly removed (FIG. 2C) configured in accordance with embodiments of the present disclosure.
Figure 2B:
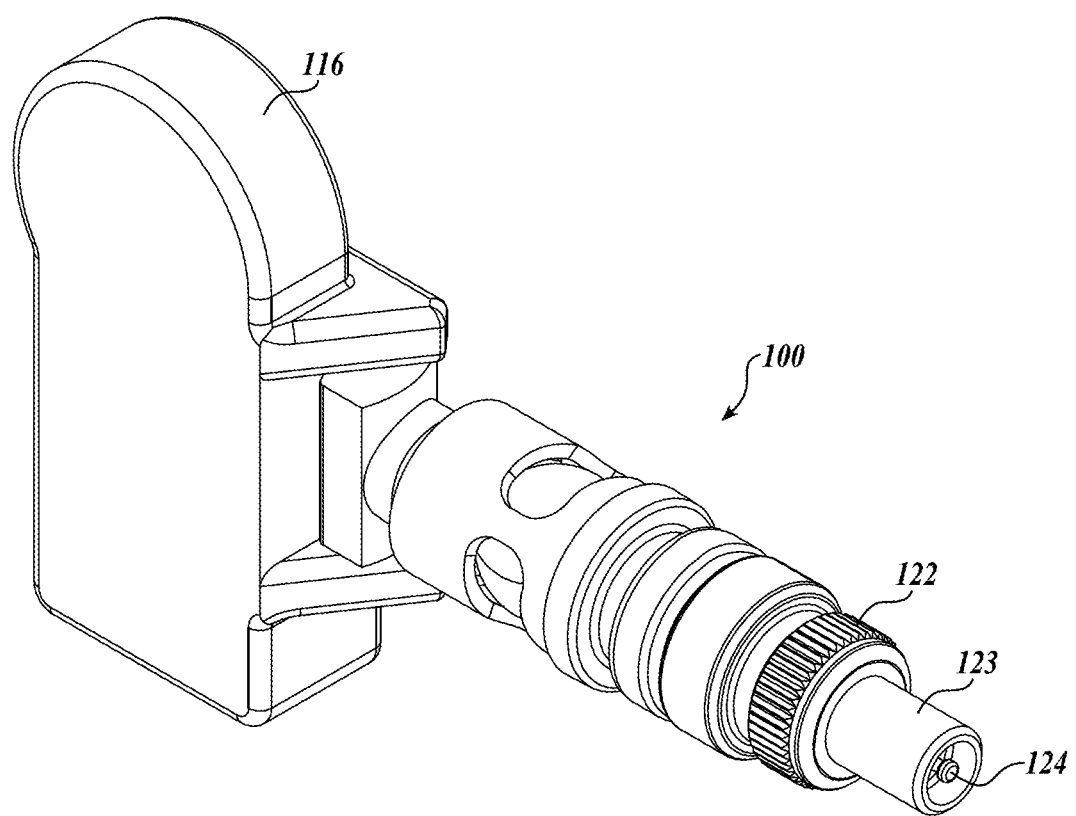
Figure 2C:
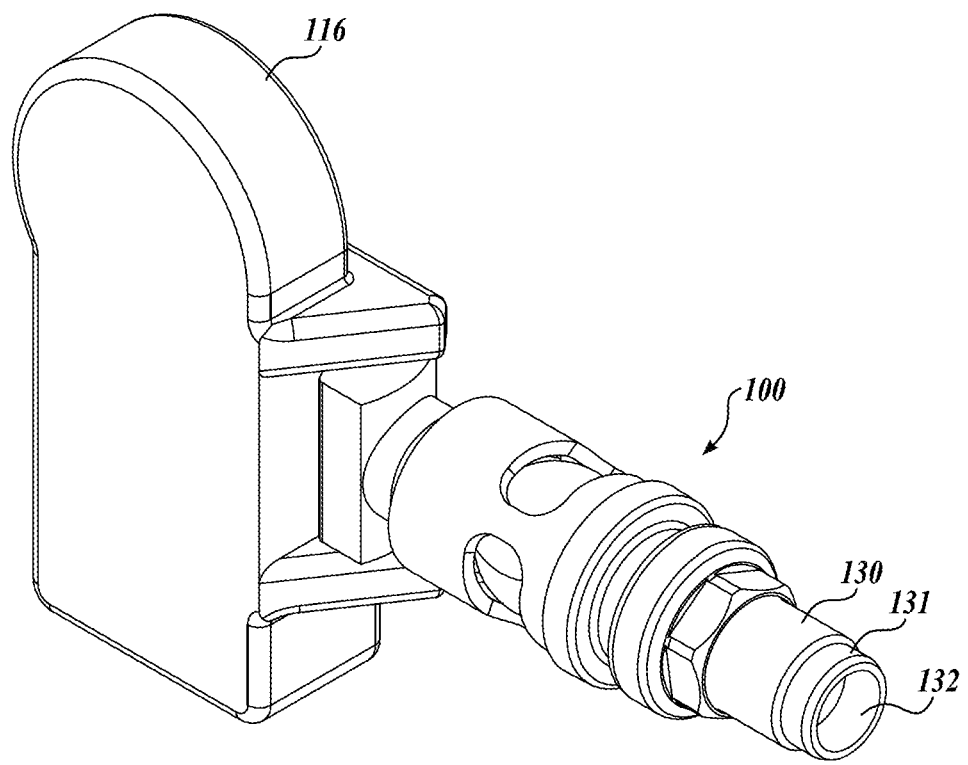

FIGS. 2A-2C are perspective views of a ball-checked rapid-inflate valve stem assembly ("assembly 100"), showing the full valve stem assembly (FIG. 2A), the valve stem assembly with a dust cap 120 removed (FIG. 2B), and the valve stem assembly with a compatibility fill cap assembly 122 removed (FIG. 2C) configured in accordance with embodiments of the present disclosure. FIG. 2D is an exploded view of the assembly 100 of FIGS. 2A-2C. In the illustrated views of FIGS. 2A-2C, the assembly 100 can be configured for use with the valve stem port VSP wheel W in place of a conventional inflation/deflation valve stem (e.g., a conventional Schrader valve assembly, a Presta valve assembly, etc.). The assembly 100 includes features for rapid inflation of the gas within the pressure chamber of a tire (not shown). In some embodiments, the assembly 100 can include a tire pressure monitoring system (TPMS) sensor 116 operably coupled to an end of the assembly 100 located inside the pressure chamber of the tire and configured to monitor the pressure within the pressure chamber and send data related to the pressure to, e.g., the computer of the vehicle. As described herein, embodiments of the assembly 100 may be configured for use with any gas exchange system.

Referring to FIG. 2A with FIG. 2B together, the dust cap 120 can enclose an end of the assembly 100 (FIG. 2A), preventing ingress of dust, dirt, liquid, and other contaminants, particularly as the vehicle travels in off-road conditions. The dust cap 120 can be configured to threadingly or otherwise engage with the compatibility fill cap assembly 122, which can include a threaded interface portion 123 (FIG. 2B, threads not shown) similar to the threaded interface portion of a conventional Schrader valve interface. With the dust cap removed (FIG. 2B), the threaded interface portion 123 can receive conventional Schrader inflation nozzles and conventional Schrader tire pressure gauges, among other tools. Removing the dust cap 120 from the compatibility fill cap assembly 122 exposes a portion of a valve core 124 (illustrated as a conventional Schrader valve core herein) configured to selectively permit gas through the assembly 100 when a core needle of the valve core 124 is translated.

Referring to FIG. 2C, the compatibility fill cap assembly 122 can be removed from the assembly 100 to expose a rapid-inflate interface 131 positioned at an inlet end having a central passage 132 through which gas flows to inflate the pressure chamber of the tire. In some embodiments, the compatibility fill cap assembly 122 is threadingly couplable to a central valve body 130 (exterior threads not shown) positioned adjacent to the rapid-inflate interface 131. The rapid-inflate interface 131 can be sized and configured to operably couple to a compatible rapid-inflate nozzle to create a seal for inflation of the pressure chamber of the tire. In these embodiments, the rapid-inflate interface 131 can be capable of transferring gas into the pressure chamber of the tire at about thirty times faster, or greater, than transferring gas into the pressure chamber using a conventional Schrader valve.

FIG. 2D is an exploded view of the assembly 100. In the illustrated embodiment, the assembly includes the dust cap 120, the valve core 124, and the compatibility fill cap assembly 122 with the threaded interface portion 123. The compatibility fill cap assembly 122 can be threadingly coupled to the central valve body adjacent to the rapid-inflate interface 131 at the inlet end and can include a seal (o-ring 134) positioned therebetween (see FIG. 3B) to prevent gas leaking between the components. The central valve body 130 can receive thereon the inner clamp portion 110, a seal 140, and the outer clamp portion 112, together clamping against surfaces of the wheel W and operably coupling the assembly 100 to the wheel W in the valve stem port VSP. The outer clamp portion 112 can include a hex portion 138 configured to receive a socket tool to aid in tightening the outer clamp portion 112 against the wheel W and increase the clamping force with the inner claim portion 110. The seal 140 can be configured to seal against surfaces of the wheel W around the valve stem port VSP to prevent gas from flowing around the assembly 100 through the valve stem port VSP.

The central valve body 130 includes the central passage 132 extending concentrically therethrough, and a ball housing 154 having a chamber configured to receive a check ball 160. The ball housing 154 includes rapid-inflate orifices 156 extending radially through the ball housing 154 and configured to permit gas flow radially outward from the central passage 132 into the pressure chamber of the tire. Although the illustrated embodiment shows a shape and quantity of rapid-inflate orifices 156, in other embodiments any suitable configuration of rapid-inflate orifice is within the scope of the present disclosure. The check ball 160 can be configured to interface with a biasing spring 162 that seats the check ball 160 against a sealing surface 158 (see FIG. 3B) extending radially outward from the central passage 132 and inside of the ball housing 154 of the central valve body 130 to prevents gas escaping the pressure chamber of the tire when the compatibility fill cap assembly 122 is removed from the central valve body 130.

During inflation through the assembly 100, the biasing spring 162 can compress against a base member 170 to allow translation of the check ball 160 to an open position away from the central valve body 130, opening a fluid pathway from the central passage 132 and through the rapid-inflate orifices 156. As will be described in greater detail below, the assembly 100 can include a ball interfacing member 136 that translates the check ball 160 to the open position, e.g., by interface with the core needle of the valve core 124, with a rapid-inflate nozzle, etc. In other embodiments, the ball interfacing member 136 may be omitted and the biasing spring 162 can be configured to compress based on sufficient pressure from inflation acting on the check ball 160 to translate the check ball 160 to the open position. The base member 170 can include a TPMS sensor mounting feature 172 configured to provide a mounting location for the TPMS sensor 116, which can include a corresponding TPMS sensor interface 118 configured to operably couple to the TPMS sensor mounting feature 172.

FIGS. 3A and 3B are side and side cross-sectional views, respectively, of the assembly 100, with the check ball 160 shown in a closed position; FIG. 3C is a side cross-sectional view of the assembly, with the check ball 160 shown in an open position; and FIG. 3D is a side cross-sectional view of the assembly 100, with the check ball 160 shown in an open position and with the compatibility fill cap assembly 122 removed from the central valve body 130. In FIGS. 3A-3D, some reference numerals of components shown in FIG. 2D are omitted for purposes of clarity.

FIG. 3B shows the check ball 160 in the closed position against the sealing surface 158 to prevent gas from flowing through the central passage 132 and through the rapid-inflate orifices 156, or flowing from the pressure chamber of the tire through the central passage 132 (which would deflate the tire). FIG. 3C shows the compatibility fill cap assembly 122 operably coupled to the central valve body 130 and the check ball 160 in the open position, permitting gas flow from the inflation nozzle (not shown) and through the assembly 100 along a first inflation path IP1. In this configuration, the core needle of the valve core 124 is translated in the open valve direction OV to permit gas flow through the valve core 124. The translation of the core needle in the open valve direction OV correspondingly translates the ball interfacing member 136, which in turn translates the check ball 160, compressing the biasing spring 162 and permitting gas flow along the inflation path IP1.

FIG. 3D shows the compatibility fill cap assembly 122 removed from the central valve body 130 and the check ball 160 in the open position, permitting gas flow from a rapid-inflation nozzle (not shown) and through the assembly 100 along a second inflation path IP2. Removal of the compatibility fill cap assembly 122 exposes the rapid-inflate interface 131 that is configured to be operably coupled to a rapid-inflation nozzle for rapid-inflation of the pressure chamber of the tire. During inflation in the configuration shown in FIG. 3D, the rapid-inflation nozzle can translate the ball interfacing member 136, which in turn translates the check ball 160, compressing the biasing spring 162 and permitting gas flow along the inflation path IP2. In other embodiments, the gas pressure from the rapid-inflation nozzle overcomes the biasing force of the biasing spring 162 and translates the check ball 160 to the open position without contacting the ball interfacing member 136. In the illustrated configuration, the assembly 100 can also be used to rapidly deflate the pressure chamber of the tire by translating the ball interfacing member 136 and/or the check ball 160, e.g., with a tool, thereby permitting gas to flow past the check ball 160 and the tool to escape to atmosphere.

Figure 4A:
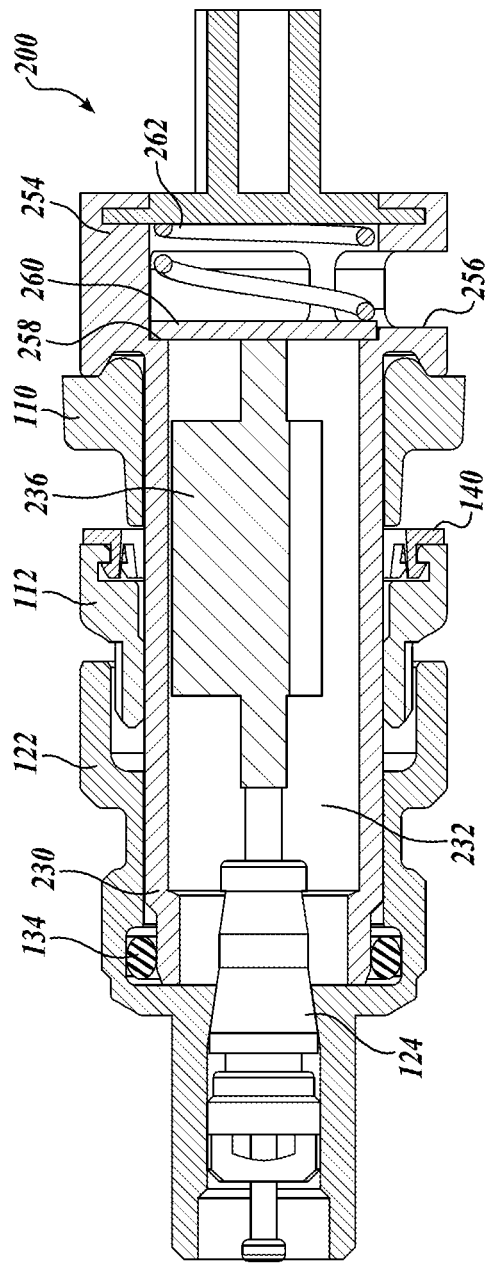
FIG. 4A is a side cross-sectional view of a plate-checked rapid-inflate valve stem assembly configured in accordance with embodiments of the present disclosure, with a plate of the plate-checked rapid-inflate valve stem assembly shown in a closed position.
Figure 4B:
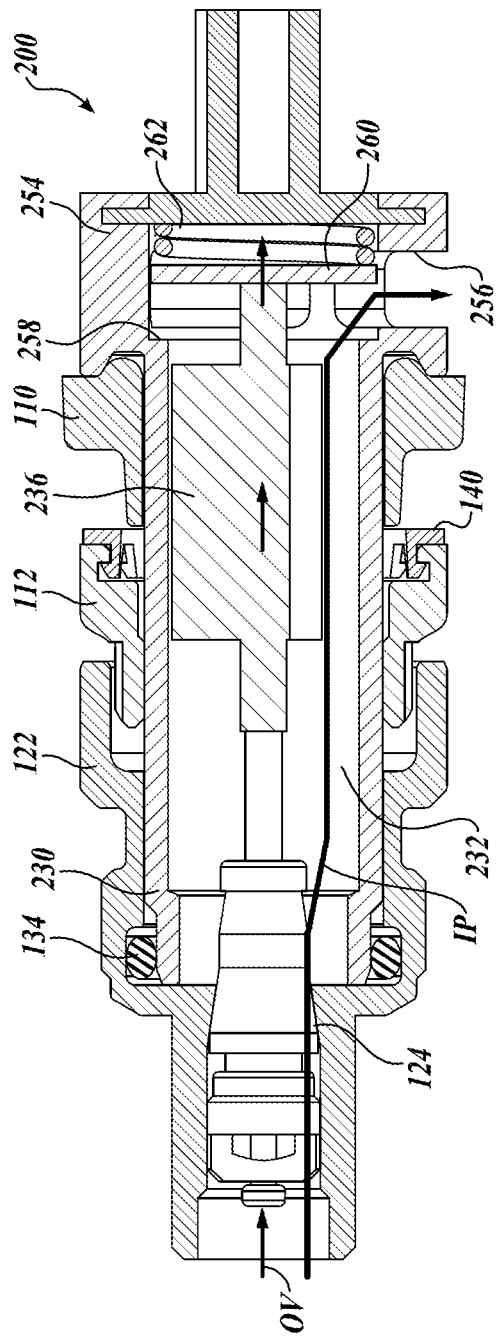
FIG. 4B is a side cross-sectional view of the valve stem assembly of FIG. 4A, with the plate shown in an open position, and showing a representative inflation path of the gas flow into the pressure chamber within the tire.

FIG. 4A is a side cross-sectional view of a plate-checked rapid-inflate valve stem assembly 200 ("assembly 200") configured in accordance with embodiments of the present disclosure, with a check plate 260 shown in a closed position; and FIG. 4B is a side cross-sectional view of the assembly 200, with the check plate 260 shown in an open position. Some components of the assembly 200 are substantially similar to the components of the assembly 100, except that the assembly 200 (with differing components generally denoted in the 200-level) includes a check plate 260 rather than a check ball 160 (of the assembly 100). In this regard, the assembly 200 includes other differences to accommodate the check plate 260, such as a plate housing 254, configuration of a sealing surface 258, a biasing spring 262, rapid-inflate orifices 256, among other differences.

Figure 5B:
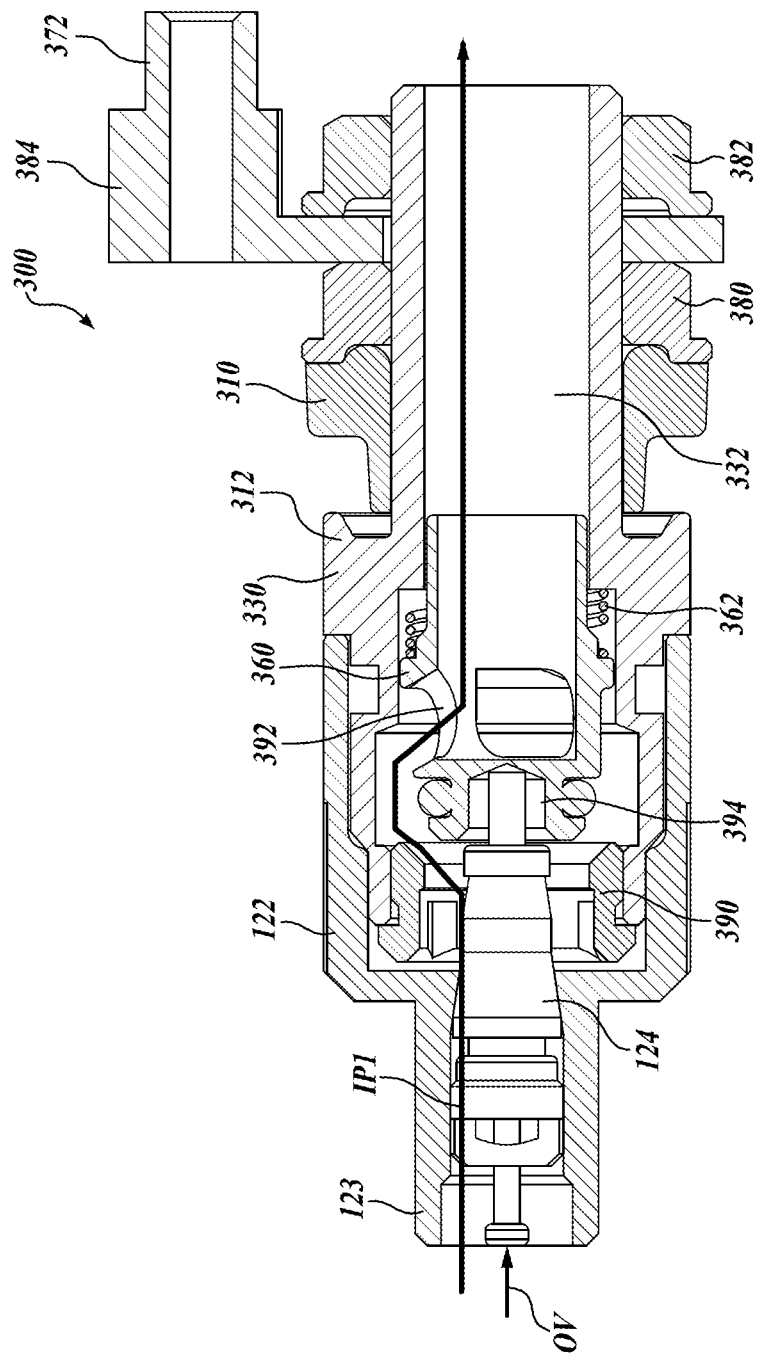
Figure 5C:
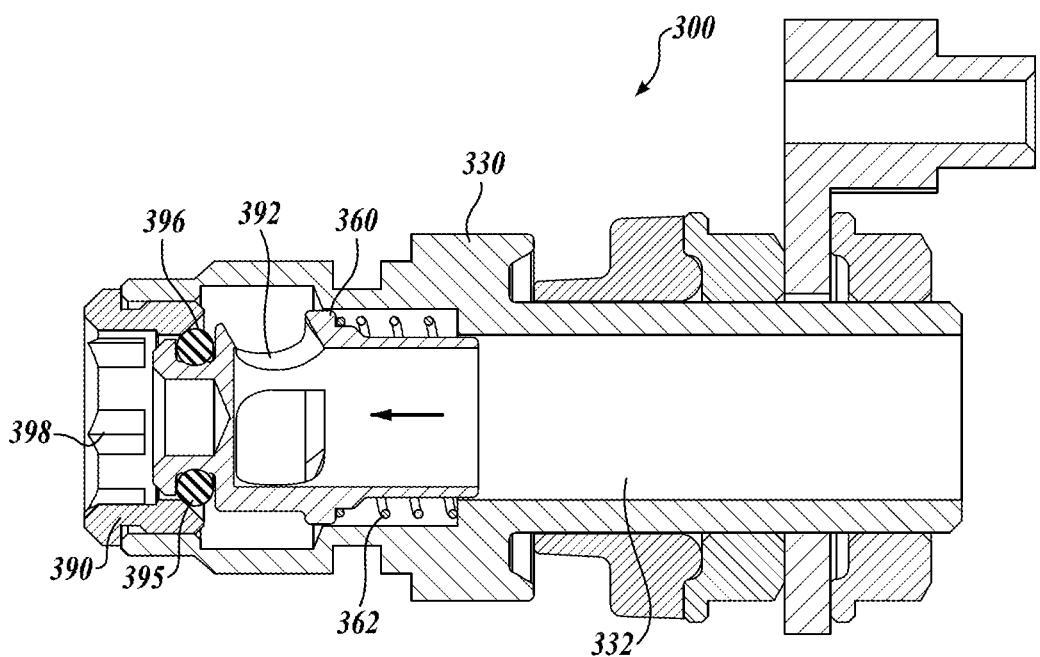
FIG. 5C is a side cross-sectional view of the valve stem assembly of FIGS. 5A and 5B, with the poppet shown in a closed position.
Figure 5D:
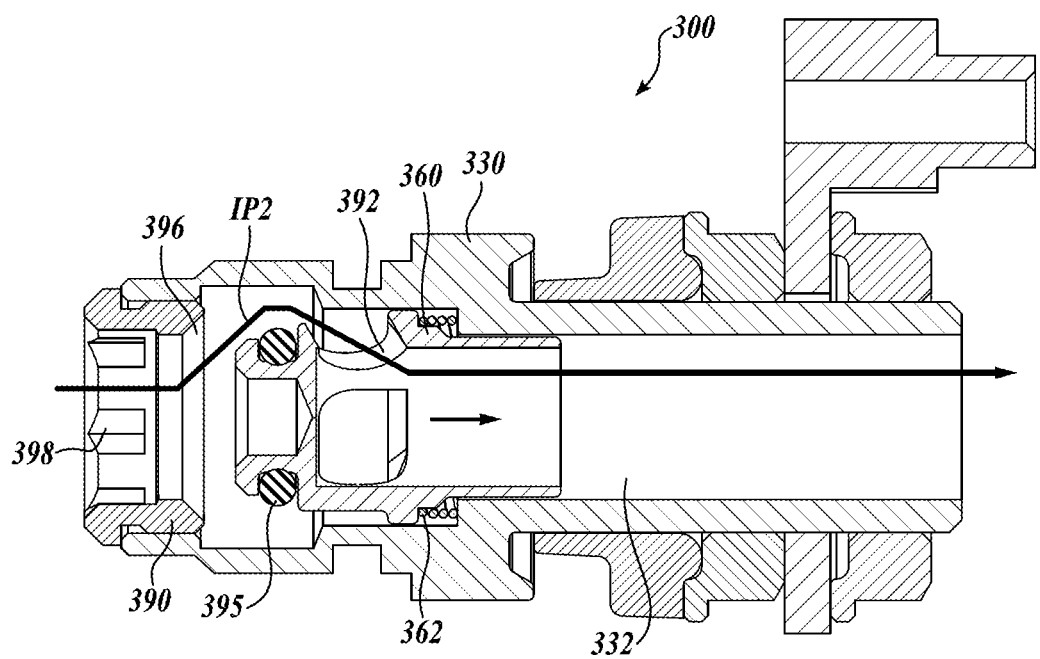
FIG. 5D is a side cross-sectional view of the valve stem assembly of FIGS. 5A and 5B, with the poppet shown in the open position and with the compatibility fill cap assembly removed, and showing a representative inflation path of the gas flow into the pressure chamber within the tire.

FIG. 4A shows the check plate 260 in the closed position against the sealing surface 258 to prevent gas from flowing through the central passage and through the rapid-inflate orifices 256, or flowing from the pressure chamber of the tire through the central passage (which would deflate the tire). FIG. 4B shows the compatibility fill cap assembly 122 operably coupled to the central valve body 230 and the check plate 260 in the open position, permitting gas flow from the inflation nozzle (not shown) and through the assembly 200 along an inflation path IP. In this configuration, the core needle of the valve core 124 is translated in the open valve direction OV to permit gas flow through the valve core 124. The translation of the core needle in the open valve direction OV correspondingly translates the plate interfacing member 236, which in turn translates the check plate 260, compressing the biasing spring 262 and permitting gas flow along the inflation path IP. Although not shown, the compatibility fill cap assembly 122 can be removed from the assembly 200 in a similar manner to the assembly 100 shown in FIG. 3D. In this regard, the assembly 200 can be compatible with a rapid-inflate nozzle to translate the check plate 260, compressing the biasing spring 262 and permitting rapid-inflation of the pressure chamber of the tire. Although the assemblies 100 and 200 show a check ball 160 and a check plate 260, respectively, other embodiments of the sealing member FIG. 5A is a side view and FIGS. 5B-5D are side cross-sectional views of a poppet-checked rapid-inflate valve stem assembly ("assembly 300") configured in accordance with embodiments of the present disclosure. FIG. 5B shows a poppet 360 of the assembly 300 in an open position; FIG. 5C shows the poppet 360 in a closed position; and FIG. 5D shows the poppet 360 in an open position and with a compatibility fill cap assembly 122 removed from the central valve body 330. Some components of the assembly 300 are substantially similar to the components of the assemblies 100 and 200, except that the assembly 300 (with differing components generally denoted in the 300-level) includes a poppet 360 rather than a check ball 160 (of the assembly 100) or a check plate 260 (of the assembly 200). In this regard as shown in FIGS. 5A and 5B, the assembly 300 includes other differences to accommodate the poppet 360, such as a poppet housing 354, a biasing spring 362, inner and outer TPMS mounting nuts 380 and 382, a TPMS mounting bracket 384 therebetween, a TPMS sensor mounting feature 372, among other differences. The assembly 300 can have an integrated outer portion 312 formed as part of a central valve body 330 that clamps with a clamp portion 310 to interfaces with the wheel W to mount the assembly 300 in the valve stem port VSP.

FIG. 5B shows the poppet 360 of the assembly 300 in an open position, which is held against the biasing spring 362 by the valve core 124 interfacing with a pocket 394 of the poppet 360. The poppet 360 can include radial orifices 392 configured to permit gas flow through a central passage 332 to inflate the pressure chamber of the tire. When the compatibility fill cap assembly 122 is installed, as shown in FIG. 5B, the valve core 124 contacts the pocket 394 of the poppet 360 to translate the poppet 360 to the open position permitting gas flow along the first inflation path IP1. The open position shown in FIG. 5B can be an intermediate position with respect to the travel of the poppet 360 such that the poppet 360 can translate farther as an inflation nozzle or pressure gauge is attached to the threaded interface portion 123, thereby translating a core needle in the open valve direction OV and correspondingly translating the poppet 360.

FIG. 5C shows the poppet 360 in a closed position and FIG. 5D shows the poppet 360 in an open position, each with the compatibility fill cap assembly 122 removed from the central valve body 330. With the compatibility fill cap assembly 122 removed, the valve core 124 is also removed and does not interface with the poppet 360. In this regard, the poppet 360 can return to the closed position based on the biasing force of the biasing spring 362. The poppet 360 can include a seal 395 (e.g., an o-ring) that abuts against a sealing surface 396 on a stopping member 390 ("poppet stopper 390"). The poppet stopper 390 can be configured to threadingly interface with the central valve body 330, with features 398 (e.g., hex key angles) to install and remove the poppet stopper 390. In the closed position, the interface of the seal 395 with the sealing surface 396 based on the biasing force of the biasing spring 362 prevents gas flow from the pressure chamber of the tire through the assembly 300. In the illustrated configuration of FIG. 5C, the assembly 300 can also be used to rapidly deflate the pressure chamber of the tire by translating the poppet 360, e.g., with a tool, thereby permitting gas to flow past the poppet 360 and the tool to escape to atmosphere.

As shown in FIG. 5D, during inflation, the poppet 360 is translated (e.g., by the inflation nozzle, by gas pressure, etc.) to the open position, compressing the biasing spring 362 and permitting gas flow along the second inflation path IP2. In the absence of the valve core 124 (FIG. 5B), the second inflation path IP2 is significantly more open, permitting rapid inflation of the pressure chamber of the tire. The assembly 300 can further be used to manually deflate the pressure chamber of the tire by using a too to translate the poppet 360 toward the open position, thereby permitting gas to escape.

Figure 6A:
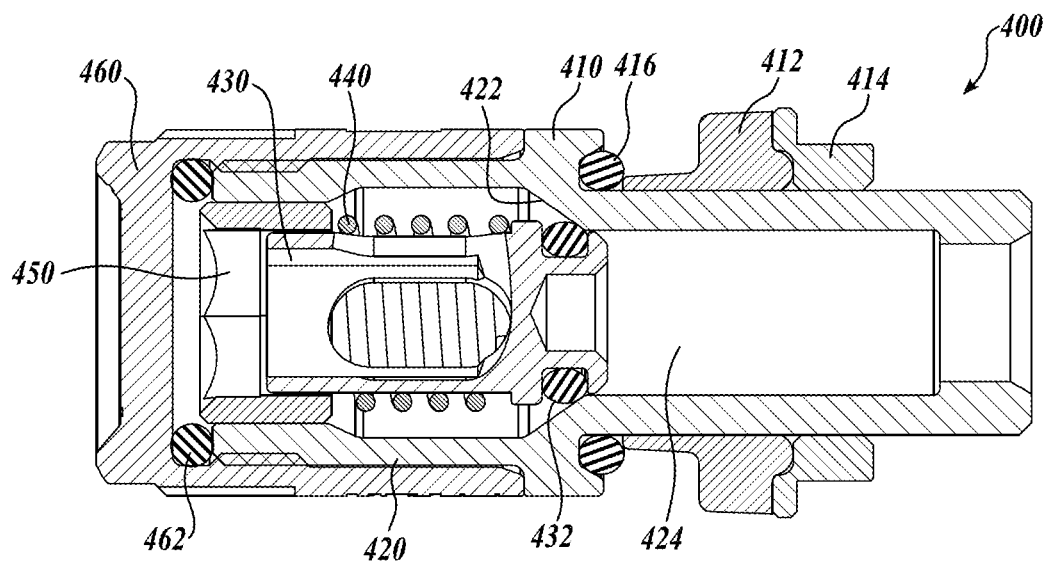
FIGS. 6A and 6B are side cross-sectional views of a rapid-deflate to pressure set valve stem assembly in accordance with embodiments of the present disclosure.
Figure 6B:
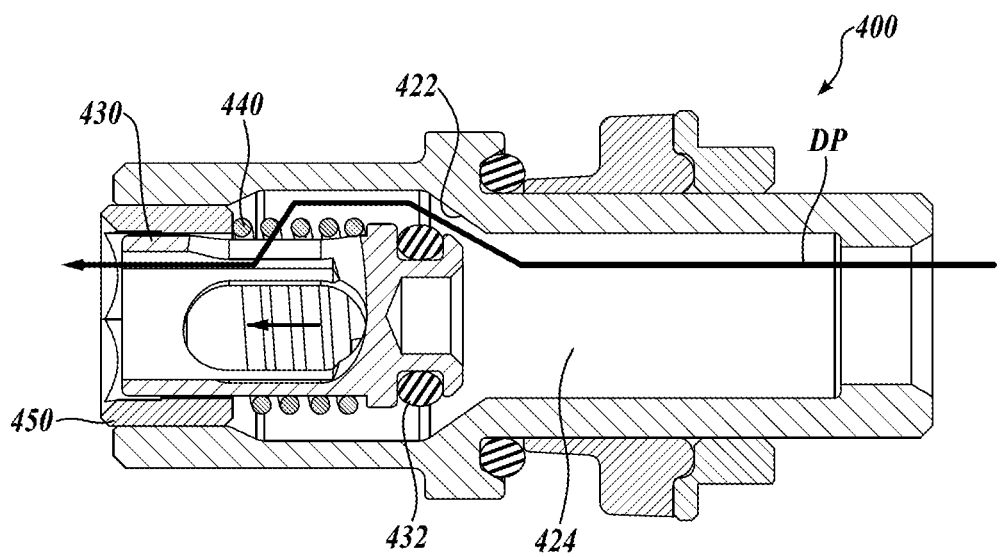

FIGS. 6A and 6B are side cross-sectional views of a rapid-deflate to pressure set valve stem assembly 400 ("assembly 400"), in accordance with embodiments of the present disclosure. The assembly 400 can be used to set a desired deflate pressure with the assembly 400 and open the valve to automatically deflate the pressure chamber of the tire to the set pressure. The assembly 400 includes a central valve body 410 and a clamp portion 412 configured to clamp on either side of the valve stem port VSP of the wheel W to operably couple the assembly 400 to the wheel at the valve stem port VSP. The assembly 400 includes a nut 414 that can tighten the clamp portion 412 against the wheel to secure the assembly 400. A seal 416 (e.g., an o-ring) can be configured adjacent to the central valve body 410 to prevent gas from flowing past the assembly 400 through the valve stem port VSP.

The central valve body 410 can include a poppet housing portion 420 in which a poppet 430 can traverse, a central passage 424, and a sealing surface 422 against which a seal 432 of the poppet 430 rests to stop the flow of gas through the assembly 400. The assembly 400 can further include a preload insert 450 that is threadingly coupled to the poppet housing portion 420. The preload insert 450 may have features (e.g., allen key flats) to aid in turning the preload insert 450 to set the deflate pressure of the assembly 400. A biasing spring 440 can be positioned to extend between the preload insert 450 and the poppet 430 and impart a biasing force that urges the poppet 430 toward the sealing surface 422. As the preload insert 450 is tightened, the preload insert 450 moves toward the sealing surface 422, compressing the biasing spring 440 and increasing the biasing force that urges the poppet 430 toward the sealing surface 422, thereby increasing the set pressure of the assembly 400 (by requiring higher pressure to open the poppet 430). As the preload insert 450 is loosened, the preload insert 450 moves away from the sealing surface 422, relaxing the biasing spring 440 and decreasing the biasing force that urges the poppet 430 toward the sealing surface 422, thereby decreasing the set pressure of the assembly 400 (by lowering the pressure required to open the poppet 430).

As shown in FIG. 6A, the assembly 400 can further include a cap 460 operably coupled to the poppet housing portion 420 and enclosing the passage through the preload insert 450. When the cap is installed (FIG. 6A), the gas in the pressure chamber of the tire cannot escape through the assembly 100. As shown in FIG. 6B, when the cap is removed, the gas pressure in the pressure chamber can overcome the biasing force of the biasing spring 440 on the poppet 430 and urge the poppet 430 and the seal 432 away from the sealing surface 422 and toward the preload insert 450, permitting gas flow along the deflation path DP. As the gas flows through the central passage 424, the pressure in the pressure chamber of the tire drops. At the set pressure, the gas pressure will no longer overcome the biasing force of the biasing spring 440, thereby urging the seal 432 of the poppet 430 against the sealing surface 422 and preventing further gas from flowing through the assembly 400.

In some embodiments, the assembly 400 can be used with a dual valve stem port wheel, such as the wheel W shown in FIG. 1A. With the assembly 400 operably coupled to one of the valve stem ports, the set pressure of the assembly 400 can be set by fully tightening the preload insert 450 and placing a gauge on the valve at the other valve stem port. With the pressure chamber of the tire inflated, the preload insert 450 can be loosened while observing the gauge. As the biasing force of the biasing spring 440 overcomes the gas pressure, the poppet 430 will close and the gas flow through the assembly 400 will stop. The procedure can be repeated until the gas flow through the assembly 400 stops at the desired set pressure. The tire can then be inflated to the standard on-road pressure. When the lower set pressure is desired (e.g., when traveling off-road), removing the cap 460 will cause the poppet 430 to open and release gas from the pressure chamber of the tire until the pressure reaches the set pressure of the assembly 400.

Although embodiments are shown for use with an automotive wheel and tire configuration for purposes of the present disclosure, the valve assemblies and rapid-inflate valve assemblies described herein can be used with any suitable type of gas system, e.g., wheels and tires on other types of vehicles, other gas valve uses, gas-filled suspension components, etc. Accordingly, the various embodiments of the present technology described herein are not limited to use with a particular configuration.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., gas, air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. An inflation valve assembly, comprising: an annular body configured to couple to a valve stem port and selectively permit gas flow through the valve stem port, the annular body having: a central passage extending from an outlet end concentrically through at least a portion of the annular body; and a chamber fluidly coupled to the central passage and extending from the central passage toward inlet end; a stopping member operably coupled to the annular body at the inlet end, the stopping member having a sealing surface facing the chamber; a sealing member slidable within the chamber; a biasing member urging the sealing member toward the sealing surface; and a fill cap assembly operably coupled to the annular body at the inlet end, the fill cap assembly comprising: a sleeve portion configured to engage with the annular body at the inlet end; and a central valve chamber extending concentrically through the fill cap assembly; and a valve core received within the central valve chamber to selectively permit gas flow through the fill cap and into the central valve chamber, wherein: when in a closed position, the sealing member is positioned in contact with the sealing surface to prohibit gas flow between the inlet end and the central passage; when in an open position, the sealing member is positioned away from the sealing surface to permit gas flow between the inlet end and the central passage; and the valve core is positioned with respect to the fill cap assembly such that the act of coupling the fill cap assembly to the annular body translates the sealing member from the closed position toward the open position.

2. The inflation valve assembly of claim 1, wherein the sealing member is a poppet having an orifice extending radially through the poppet, the orifice configured to permit gas flow from the inlet end to the central passage.

3. The inflation valve assembly of claim 1, wherein the inflation valve assembly is configured to couple to the valve stem port located in a vehicle wheel having a tire with an internal pressure chamber.

4. The inflation valve assembly of claim 1, wherein the stopping member is threadingly coupled to the annular body.

5. The inflation valve assembly of claim 1, wherein the fill cap assembly
further comprises a seal configured to prevent gas flow between the fill cap and the annular body at the inlet end.

6. The inflation valve assembly of claim 5, wherein translating a core needle of the valve core toward the central passage correspondingly translates the sealing member further toward the open position.

7. The inflation valve assembly of claim 5, wherein the sleeve portion has threads configured to threadingly engage with threads positioned at the inlet of the annular body.

8. The inflation valve assembly of claim 5, wherein the valve core is a Schrader valve core, and wherein the fill cap has threads configured to receive a component having a Schrader valve socket.

9. A wheel, comprising:
a first valve stem port having an inflation valve assembly according to claim 1 received therein; and
a second valve stem port.

10. The wheel of claim 9, wherein the second valve stem port has a deflation valve stem assembly received therein.

11. The wheel of claim 9, wherein the second valve stem port has a deflation valve stem cover received therein.

12. The wheel of claim 9, wherein the second valve stem port has a Schrader valve received therein.

13. The wheel of claim 10, wherein the second valve stem port has a deflation to pressure set valve stem assembly received therein.

\* \* \* \* \*